US012719802B2

(12) United States Patent
Toy

(10) Patent No.: US 12,719,802 B2
(45) Date of Patent: Aug. 25, 2026

(54) SYSTEMS AND METHODS FOR APPLICATION LAYER PROTOCOL QUALITY OF SERVICE MARKING

(71) Applicant: Verizon Patent and Licensing Inc., Basking Ridge, NJ (US)

(72) Inventor: Mehmet Toy, Allendale, NJ (US)

(73) Assignee: Verizon Patent and Licensing Inc., Baskign Ridge, NJ (US)

( * ) Notice: Subject to any disclaimer, the term of this patent is extended or adjusted under 35 U.S.C. 154(b) by 161 days.

(21) Appl. No.: 18/339,635

(22) Filed: Jun. 22, 2023

(65) Prior Publication Data

US 2024/0430205 A1 Dec. 26, 2024

(51) Int. Cl.

| | |
|---|---|
| ***H04L 47/24*** | (2022.01) |
| ***H04L 45/74*** | (2022.01) |
| ***H04L 67/02*** | (2022.01) |
| ***H04L 69/22*** | (2022.01) |

(52) U.S. Cl.

CPC .............. *H04L 47/24* (2013.01); *H04L 45/74* (2013.01); *H04L 67/02* (2013.01); *H04L 69/22* (2013.01)

(58) Field of Classification Search

CPC ......... H04L 47/24; H04L 45/74; H04L 67/02; H04L 69/22; H04L 47/2408

See application file for complete search history.

(56) References Cited

U.S. PATENT DOCUMENTS

| | | | | |
|---|---|---|---|---|
| 11,381,648 | B2 * | 7/2022 | Hund | H04L 69/22 |
| 2007/0028001 | A1 * | 2/2007 | Phillips | H04L 9/40<br>709/230 |
| 2022/0407820 | A1 * | 12/2022 | Kempanna | H04L 41/5009 |

FOREIGN PATENT DOCUMENTS

| | | | | |
|---|---|---|---|---|
| GB | 2624928 A | * | 6/2024 | H04L 47/24 |

* cited by examiner

*Primary Examiner* — Cheikh T Ndiaye

(57) ABSTRACT

In some implementations, an application device may generate a protocol data unit (PDU) associated with an application layer protocol, with the PDU including a header field. The application device may determine a priority level associated with the PDU. The application device may mark the header field with an indication of the priority level associated with the PDU. The application device may transmit, to a second network device, the PDU using the application layer protocol.

20 Claims, 17 Drawing Sheets

100

200

SYSTEMS AND METHODS FOR APPLICATION LAYER PROTOCOL QUALITY OF SERVICE MARKING

BACKGROUND

By following standard communication protocols, connected devices can receive and understand messages sent between each other. Certain protocols are associated with a transmission control protocol (TCP)/Internet protocol (IP) suite of protocols. In some examples, the TCP/IP suite of protocols may be referred to as layers, and may include an application layer, a transport layer, an Internet layer or network layer, and a link layer among other layers. In some examples, one or more of the layers may be associated with quality of service (QOS) handling. For example, a header associated with a network layer may include a type of service field, a differentiated services code point field, a traffic class field, or a similar field that may be marked to classify a packet and/or indicate a priority of the packet for handling through a network.

DETAILED DESCRIPTION OF EXAMPLE EMBODIMENTS

Figure 1A:
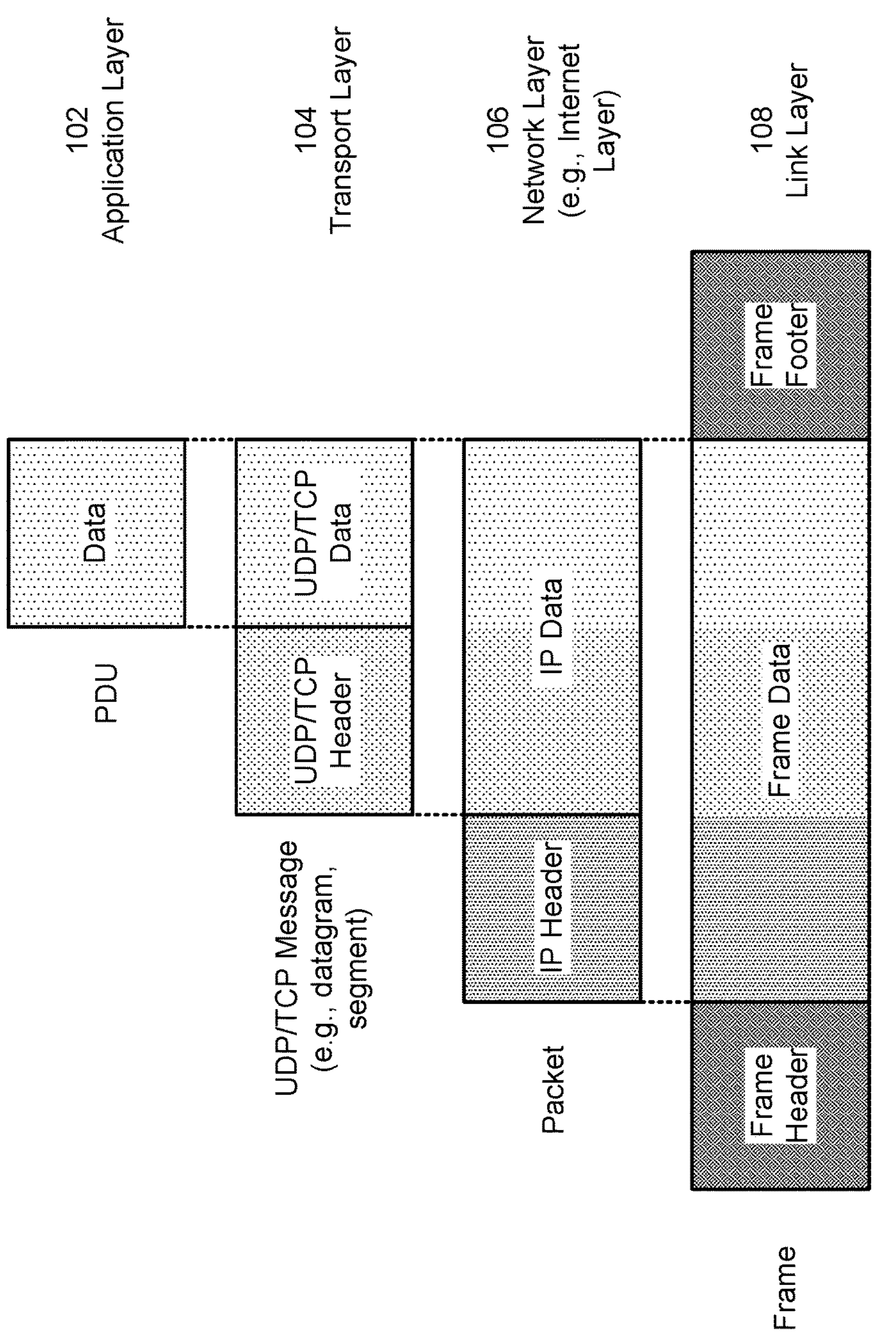
FIGS. 1A-1C are diagrams of an example associated with protocol layers.

The following detailed description of example implementations refers to the accompanying drawings. The same reference numbers in different drawings may identify the same or similar elements.

In an Internet protocol (IP) network, messages may be transmitted between connected devices using protocols. Certain protocols may be associated with header fields or other indicators used in connection with quality of service (QOS) handling. For example, an IP header (e.g., a header associated with a network layer, sometimes referred to as an Internet layer or IP layer) may include a field used to classify an IP packet and/or indicate a priority of the IP packet, and the IP packet may thus be forwarded through a network based on the classification and/or priority. For example, an IP packet may include a type of service (TOS) field, a differentiated services (DiffServ) field, a traffic class field, or a similar field used to indicate a class and/or priority of a packet, and the IP packet may be handled by routers and other network devices based on the classification. However, there is no mechanism for an application layer to indicate requested QoS handling to a network layer (e.g., an IP layer). Accordingly, an application layer message (e.g., a protocol data unit (PDU)) may be handled based on less than optimal priority considerations (e.g. best effort), resulting in communication errors, dropped packets, and overall inefficient use of network resources.

Some implementations described herein enable an application to classify an application layer PDU, such as by indicating a priority level of the PDU and/or by indicating a network layer priority class that is to be associated with the application layer PDU. In some implementations, an application layer (e.g., a network-connected device and/or a virtual device running an application program) may generate a PDU associated with an application layer protocol, such as one of a Hypertext Transfer Protocol (HTTP) message or HTTP Secure (HTTPS) message. The application layer may further determine a priority level associated with the PDU, such as by determining a DiffServ code point (DSCP) associated with the PDU and/or by determining a priority code point (PCP) associated with the PDU. The application layer may mark the PDU with an indication of the priority level, such as by marking an application layer protocol header field (e.g., an HTTP header field or an HTTPS header field) with an indication of the priority level. In some implementations, the application layer may transmit the PDU to a network layer (e.g., a network-connected device and/or a virtual device associated with a network layer), such that the network layer can mark an IP packet containing the application layer PDU with a corresponding priority class identifier (e.g., a DSCP, a PCP, or a similar identifier). As a result, application layer traffic may be handled based on optimal priority considerations, resulting in reduced communication errors and thus reduced power, computing, and network resource consumption that would otherwise be required to correct communication errors, decreased packet drop rates, and more efficient usage of network resources.

Figure 1B:
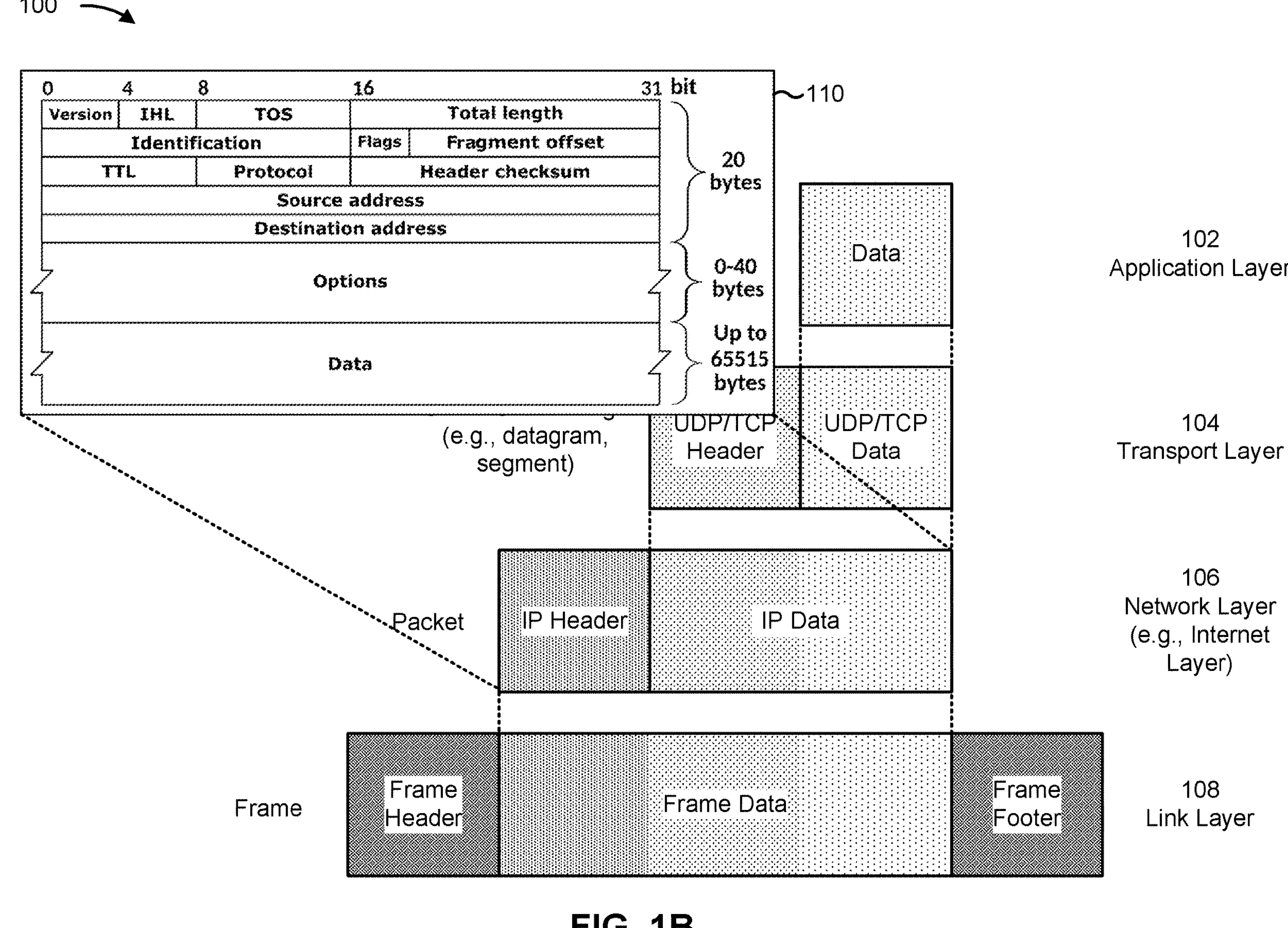
Figure 1C:
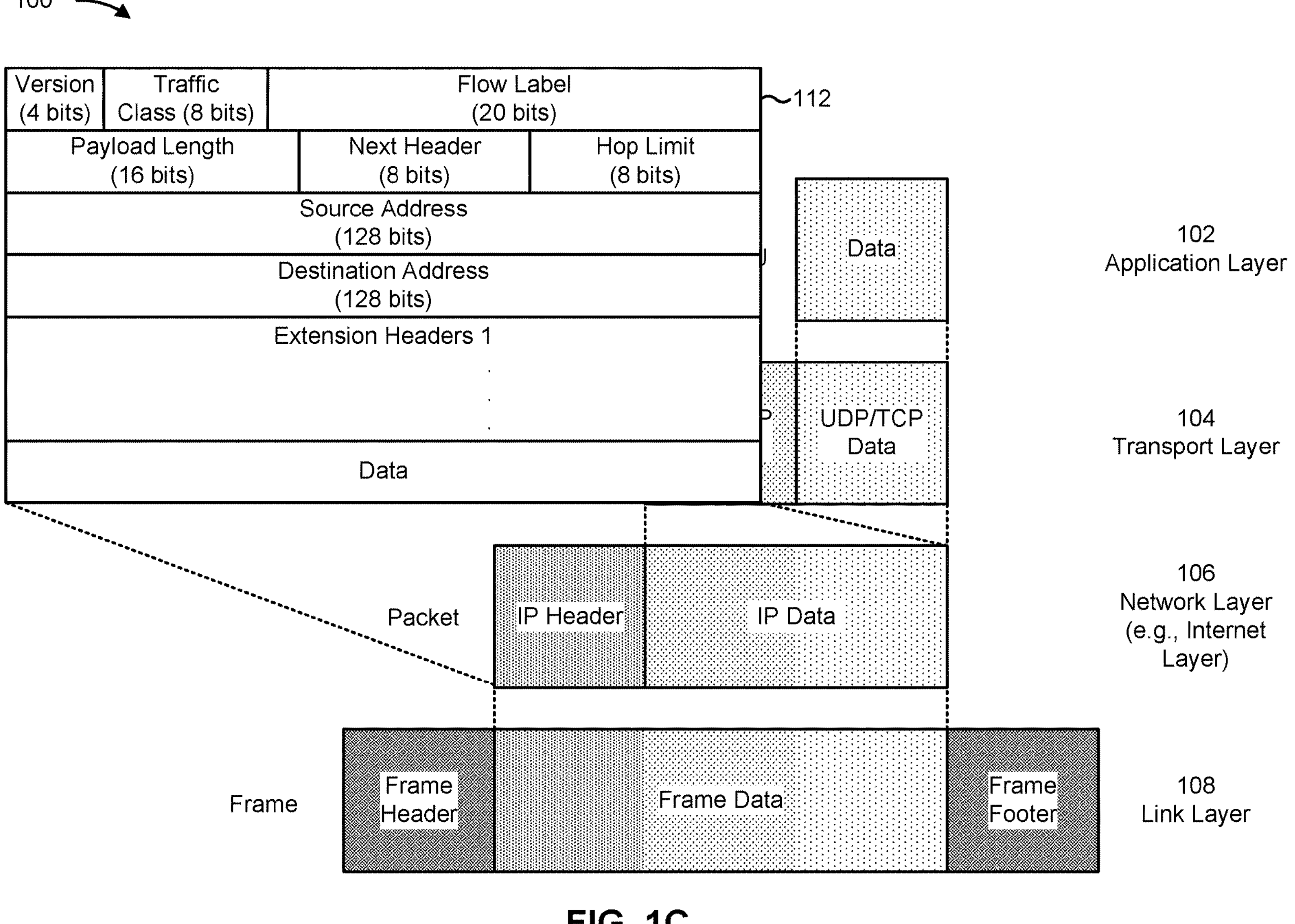

FIGS. 1A-1C are diagrams of an example 100 associated with protocol layers. The layers shown in FIGS. 1A-1C may be associated with a transmission control protocol (TCP)/IP suite of protocols. In some examples, the TCP/IP suite of protocols may include an application layer 102, a transport layer 104, a network layer 106 (e.g., an Internet layer), and a link layer 108 (sometimes referred to as a network interface layer), among other layers (e.g., a physical layer, not shown, which is below the link layer 108).

The TCP/IP suite of protocols may define how information moves from a sender to a receiver. First, application programs (e.g., the application layer 102) may transmit messages and/or streams of data (e.g., PDUs) to a transport layer 104 protocol, such as one of a user datagram protocol (UDP) or a TCP. The application layer 102 may transmit the messages and/or streams of data using an application layer protocol, such as one of HTTP or HTTPS. In cases involving HTTPS, the suite of protocols shown in FIG. 1A may further include a security layer (not shown), such as a security layer associated with one of a transport layer security (TLS) protocol or a secure socket layer (SSL) protocol. In such examples, the security layer may be located below the application layer 102 and above the transport layer 104. The transport layer 104 may receive the messages and/or stream of data from the application layer 102 (via the security layer in HTTPS), divide the messages and/or streams of data into smaller pieces (e.g., transport layer messages, sometimes referred to datagrams for UDP or segments for TCP), and add a header indicating a destination address (e.g., a destination TCP port), among other information. In that regard, messages leaving the transport layer 104 may include a UDP/TCP data portion, which may correspond to the messages and/or data received from the application layer 102 (shown in FIG. 1A using the same stippling), with a new UDP/TCP header appended to the data.

The transport layer 104 may then transmit the UDP/TCP packets to the network layer 106 (sometimes referred to as an Internet layer and/or an IP layer). The network layer 106 may enclose the packet received from the transport layer 104 in an IP datagram, may put the IP datagram in a header and trailer, may determine where to transmit the IP datagram (e.g., directly to a destination, to a gateway, or the like), and may transmit the IP datagram to the link layer 108. In that regard, IP packets leaving the network layer 106 may include an IP data portion, which may correspond to the messages and/or data received from the transport layer 104 (shown in FIG. 1A using the same stippling), with a new IP header appended to the data.

The link layer 108 may accept the IP packet and transmit the IP packet as frames over a specific network hardware, such as over Ethernet hardware or similar hardware. The frames may include a frame data portion, which may correspond to the messages and/or data received from the network layer 106 (shown in FIG. 1A using the same stippling), with a new frame header and/or frame footer appended to the data.

Messages transmitted from a remote sender to an application may travel through the above-described protocol layers in reverse, with each protocol layer stripping off the corresponding header information, until the data is back at the application layer 102. More particularly, frames may be received by the link layer 108 (e.g., logical link control and medium access control (MAC) sub layers of an Ethernet medium), which may strip off the frame header and frame footer and which may transmit the datagram to the network layer 106 (e.g., the Internet layer). The network layer 106 may strip off the IP header and transmit the packet to the transport layer 104. The transport layer 104 may strip off the UDP header and/or the TCP header and may transmit the data to the application layer 102.

In some examples, one or more of the layers may classify and/or mark a message, such as for purposes of QoS handling. For example, the network layer 106 may be associated with an IP version 4 (IPv4) or an IP version 6 (IPv6, sometimes referred to as IP next generation (IPng)), which may include one or more header fields used to classify an IP packet for priority and/or QoS handling. More particularly, FIG. 1B shows an example of an IPv4 packet 110. The IPv4 packet 110 may include numerous fields, including an eight-bit TOS field, which is sometimes referred to as a DiffServ field. The TOS field may be used to specify DiffServ associated with the packet, such as for purposes of QoS handling. Similarly, FIG. 1C shows an example of an IPv6 packet 112. The IPv6 packet 112 may include numerous fields, including an eight-bit traffic class field. The traffic class field may be used to indicate a class and/or a priority of the IPv6 packet 112 in a similar manner as the TOS field of the IPv4 packet 110. The TOS field of the IPv4 packet 110 and/or the traffic class field of the IPv6 packet 112 may indicate to routers and other network components how to handle an IP packet based on a priority of the packet. For example, if congestion occurs at a router or similar network component, packets with a lowest priority may be discarded.

In some examples, four of the eight bits associated with the traffic class field of the IPv6 packet 112 are used for indicating QoS handling information (e.g., used to indicate one of sixteen priority classes), with the remaining bits being reserved for future study and/or enhancements. Priority classes zero through seven may be used for congestion controlled traffic, and priority classes eight through fifteen may be used for uncontrolled traffic. For example, priority class 0 may correspond to unspecified traffic, priority class 1 may correspond to background data, priority class 2 may correspond to unattended data traffic, priority class 3 may be reserved (e.g., may be currently unused), priority class 4 may correspond to attended bulk data traffic, priority class 5 may be reserved, priority class 6 may correspond to interactive traffic, and priority class 7 may correspond to control traffic.

In some examples, DiffServ may use a six-bit DSCP in an eight-bit DiffServ field in an IP header for packet classification purposes, which may replace the TOS field of the IPv4 packet 110. In some other examples, a first three bits of the TOS field octet may correspond to IP precedence bits for purposes of backward compatibility, with each IP precedence value being mapped to a DiffServ class, from 0 to 7. DiffServ is a computer networking architecture that specifies a mechanism for classifying and managing network traffic and providing QoS on IP networks. For example, DiffServ may be used to provide low-latency to critical network traffic such as voice or streaming media while providing best-effort service to non-critical services such as web traffic or file transfers. In some examples, a specific DSCP may indicate that a packet is associated with default forwarding (DF) per-hop behavior (PHB), which may correspond to best-effort traffic. In some other examples, a specific DSCP may indicate that a packet is associated with an expedited forwarding (EF) PHB, which may correspond to low-loss, low-latency traffic. EF PHB may be associated with queuing to prove low delay, jitter, and/or packet loss, and/or a guaranteed amount of bandwidth, as well as policing to prevent EF PHB from preventing other types of traffic from getting through.

In some other examples, a specific DSCP may indicate that a packet is associated with assured forwarding (AF) PHB, which may correspond to ensuring delivery under prescribed conditions. AF PHB may be associated with queuing to provide a minimum bandwidth to each of four different queues, as well as three drop thresholds within each queue. In some examples, a queue/threshold combination may be categorized as one of AF11 (with the first numeral "1" indicative that the AF category is associated with the first queue and the second numeral "1" indicative that the AF category is associated with the first drop threshold), AF12, AF13, AF21, AF22, AF23, AF31, AF32, AF33, AF41, AF42, or AF43. In some examples, AF11 (corresponding to DSCP 10 and/or bit string 001010), AF21 (corresponding to DSCP 18 and/or bit string 010010), AF31 (corresponding to DSCP 26 and/or bit string 011010), and/or AF41 (corresponding to DSCP 34 and/or bit string 100010) may be associated with traffic having a low drop probability. AF12 (corresponding to DSCP 12 and/or bit string 001100), AF22 (corresponding to DSCP 20 and/or bit string 010100), AF32 (corresponding to DSCP 28 and/or bit string 011100), and/or AF42 (corresponding to DSCP 36 and/or bit string 100100) may be associated with traffic having a medium drop probability. And AF13 (corresponding to DSCP 14 and/or bit string 001110), AF23 (corresponding to DSCP 22 and/or bit string 010110), AF33 (corresponding to DSCP 30 and/or bit string 011110), and/or AF43 (corresponding to DSCP 38 and/or bit string 100110) may be associated with traffic having a high drop probability.

In some other examples, QoS handling and/or marking may be performed at the link layer 108. For example, in some Ethernet-based communications, a QoS technique sometimes referred to as class of service (CoS) may be associated with a three-bit field in an Ethernet frame header. In some examples, the three-bit field may indicate a PCP, such as for devices using virtual local area network (VLAN) tagged frames as defined by an Institute of Electrical and Electronics Engineers (IEEE) standard (e.g., IEEE 802.1Q). A PCP may specify a priority value between 0 and 7 that may be used by network components to differentiate traffic.

In some examples, a PCP value of 1 (sometimes referred to as CoS1) may correspond to a priority level of 0 (e.g., a lowest priority level), and may be used for background traffic. A PCP value of 0 (e.g., CoS0) may correspond to a priority level of 1 (e.g., a default priority level), and may be used for best effort traffic. A PCP value of 2 (e.g., CoS2) may correspond to a priority level of 2, and may be used for excellent effort traffic. A PCP value of 3 (e.g., CoS3) may correspond to a priority level of 3, and may be used for critical applications traffic. A PCP value of 4 (e.g., CoS4) may correspond to a priority level of 4, and may be used for video traffic associated with less than 100 milliseconds (ms) latency and jitter. A PCP value of 5 (e.g., CoS5) may correspond to a priority level of 5, and may be used for voice traffic associated with less than 10 ms latency and jitter. A PCP value of 6 (e.g., CoS6) may correspond to a priority level of 6, and may be used for inter-network control traffic. A PCP value of 7 (e.g., CoS7) may correspond to a priority level of 7 (e.g., a highest priority level), and may be used for network control traffic.

In some other examples, different QOS indications and/or priority level techniques and mechanisms may be employed in order to prioritize routing of certain packets through a network. For example, a private IP network may include different queues and/or categories corresponding to one or more DSCPs, PCPs, or other priority class indicators. For example, a private IP network may associate general business and/or default traffic with CoS0 at the link layer 108 (e.g., at a queue associated with the link layer 108, sometimes referred to as a Layer 2 queue) and/or with a best effort DSCP at the network layer 106 (e.g., at a queue associated with the network layer 106, sometimes referred to as a Layer 3 queue). The private IP network may associate general data with CoS1 at the link layer 108 and/or with AF11, AF12, and/or AF13 at the network layer 106. The private IP network may associate transaction data with CoS2 at the link layer 108 and/or with AF21, AF22, and/or AF23 at the network layer 106. The private IP network may associate mission critical data with CoS3 at the link layer 108 and/or with AF31, AF32, and/or AF33 at the network layer 106. The private IP network may associate video and/or priority data with CoS4 at the link layer 108 and/or with AF41, AF42, and/or AF43 at the network layer 106. And the private IP network may associate real-time and/or voice data with CoS5 at the link layer 108 and/or with an EF PHB at the network layer 106.

Traditionally, there has been no mechanism for an application layer 102 to indicate to lower layers a preferred QoS handling and/or a priority level associated with application data. Accordingly, QoS handling and/or priority level determinations and/or marking are performed by lower layers (e.g., the network layer 106 and/or the link layer 108, as described above). This may result in less than optimal packet handling for certain application data. According to some implementations described herein, an application program (e.g., the application layer 102 and/or a network device running an application) may indicate a QoS handling and/or a priority level associated with application data, such as by including an indication of a priority level in a header of an application layer PDU. Aspects of an application indicating a QoS handling and/or a priority level associated with application data are described in more detail below in connection with FIGS. 2A-2K.

As indicated above, FIGS. 1A-1C are provided as an example. Other examples may differ from what is described with regard to FIGS. 1A-1C.

Figure 2A:
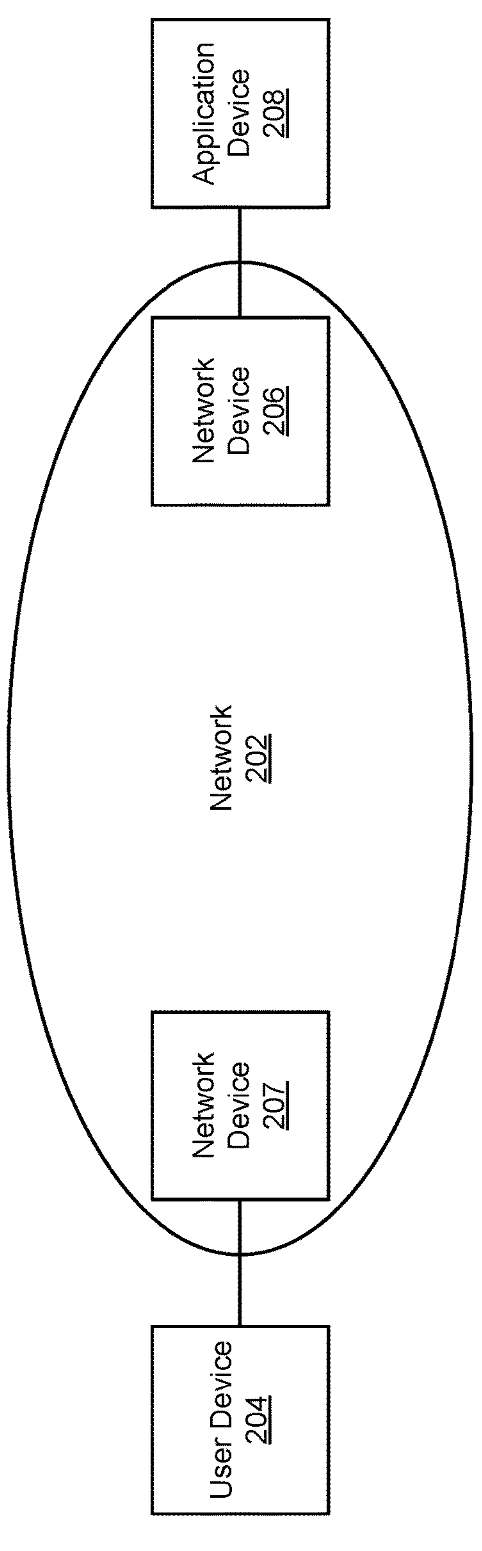
FIGS. 2A-2K are diagrams of an example associated with application layer protocol QoS marking.

FIGS. 2A-2K are diagrams of an example 200 associated with application layer protocol QoS marking. As shown in FIG. 2A, example 200 includes a network 202 and one or more devices in communication via the network 202, such as an application device 208 (e.g., a network-connected device running an application program and/or associated with the application layer 102), a first network device 206 (e.g., a network-connected device associated with the network layer 106), a second network device 207 (e.g., another network-connected device associated with the network layer 106), and/or a user device 204 (e.g., a network-connected device running an application and remote from the application device 208 and/or in communication with the application device 208 via IP connectivity, via a physical layer such as Ethernet connectivity, or the like). In some implementations, one or more of the devices described in connection with FIGS. 2A-2K may be virtual devices, described in more detail below in connection with FIG. 3. In some implementations, the devices may be in communication via various links and/or via various protocols. For example, the application device 208 may be in communication with the first network device 206 via an application layer protocol, the first network device 206 may be in communication with the second network device 207 via a network layer protocol, IP connectivity, Ethernet connectivity, or the like, and/or the second network device 207 may be in communication with the user device 204 (e.g., an application at the user device 204) via the application layer protocol.

Figure 2B:
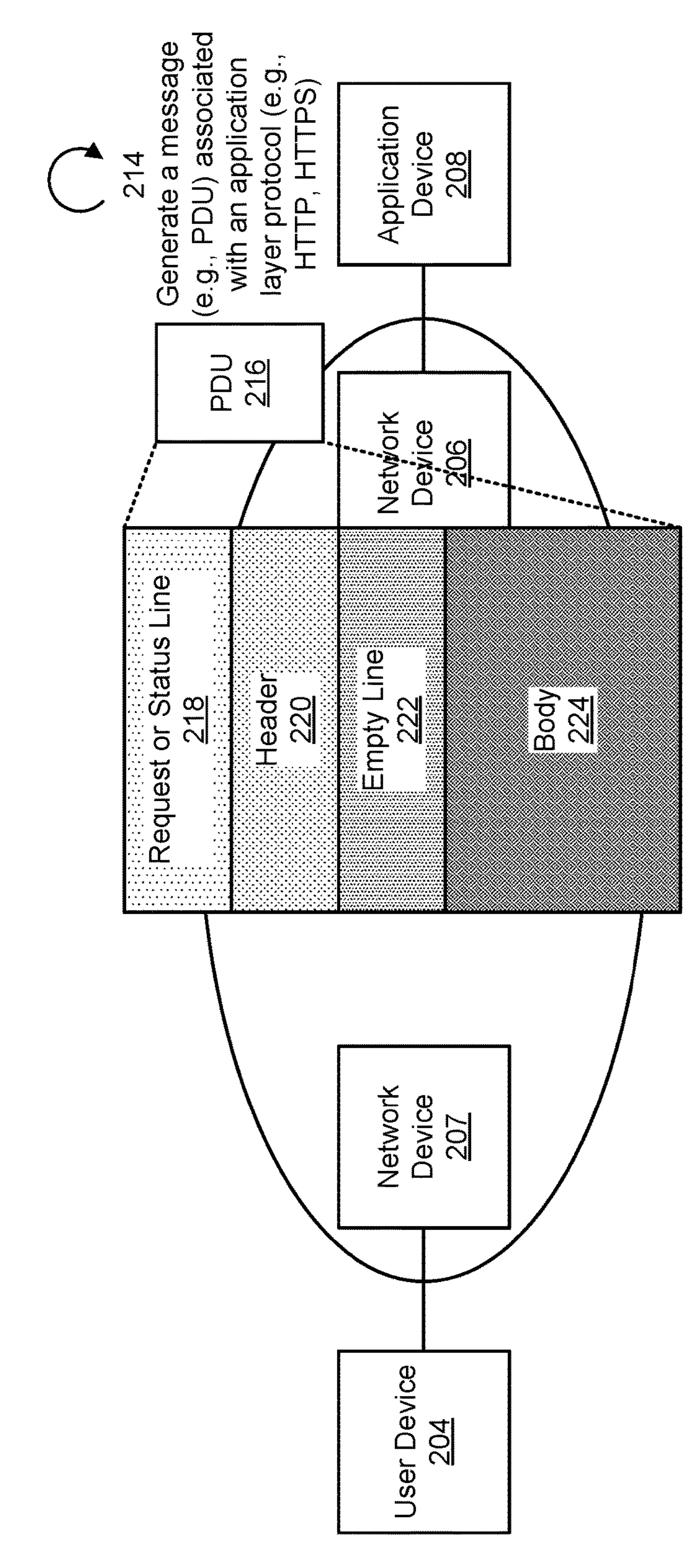

As shown by FIG. 2B, and as indicated by reference number 214, the application device 208 may generate a PDU 216 associated with an application layer protocol. For example, the application device 208 may generate a PDU used to transmit messages and/or a stream of data to the first network device 206, as described above in connection with the application layer 102 of FIG. 1A. In some implementations, the application layer protocol may be one of HTTP or HTTPS, and thus the PDU 216 may be an HTTP message (e.g., an HTTP request) or an HTTPS message (e.g., an HTTPS request). In some implementations, the PDU 216 may include a request or status line 218, a header 220, an empty line 222, and/or a body 224, among other information.

For HTTP or HTTPS messages, requests and responses may share a similar structure. The request or status line 218 may correspond to a start line (e.g., a single line) that indicates requests to be implemented (for request PDUs) or a status of a request, such as whether the request was successful or not (for response PDUs). More particularly, for an HTTP or HTTPS request PDU, the request or status line 218 may include a request type field, a uniform resource locator (URL) field and/or a uniform resource identifier (URI) field, and an HTTP version field separated by spaces. For an HTTP or HTTPS response PDU, the request or status line 218 may include an HTTP version field, a status code field, and a status phase field separated by spaces.

The header 220 may include one or more optional fields specifying the request and/or describing the body of the message, which are described in more detail below in connection with FIG. 2D. The empty line 222 may be a blank line included in the PDU 216 to indicate that all meta-information for the request has been sent, and the empty line 222 may be associated with a carriage return and/or a line feed. The body 224 may be optional and may include data associated with the request, such as content of a hypertext markup language (HTML) form, a document associated with a response, or similar data. In some implementations, a presence of the body 224 and/or a size of the body 224 may be specified by the request or status line 218 and/or the header 220. In some implementations, if a length of an HTTP or HTTPS message exceeds a maximum segment size (MSS) associated with a transport layer 104 (e.g., associated with a TCP segment), the HTTP or HTTPS message may be fragmented.

In some implementations, an HTTPS message may be similar to an HTTP message, but may be transmitted using SSL or TLS. In such implementations, request and response messages may be transmitted between layers and/or devices in encrypted form to prevent outside access to private information in the message. In some implementations, a certificate exchange may be used to enable certain devices to identify other device when utilizing HTTPS. For example, a server associated with HTTPS may create a certificate that identifies the server to a browser or similar device. HTTPS may be implemented in applications where private data is being transmitted, such as passwords, credit card numbers, or similar information.

Figure 2C:
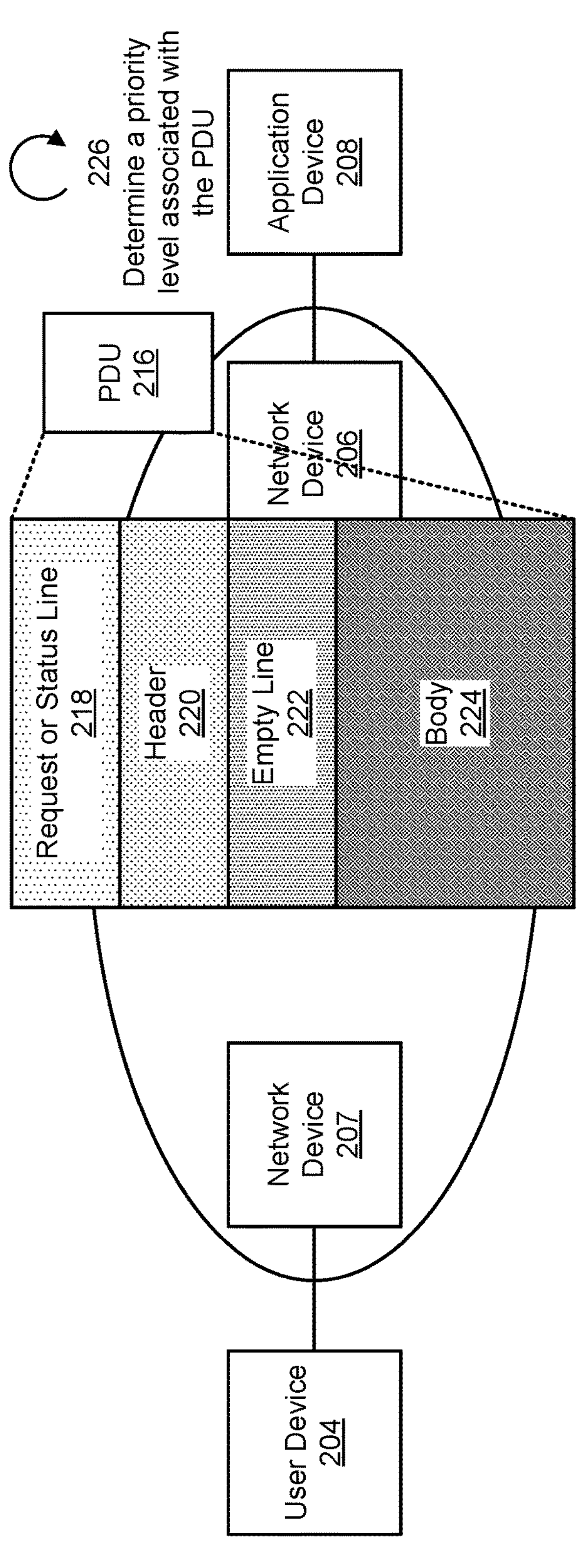

As shown by FIG. 2C, and as indicated by reference number 226, the application device 208 may determine a priority level associated with the PDU 216. For example, the application device 208 may determine one of the code points described above in connection with FIGS. 1A-1C that is to be applied to the PDU at a lower layer (e.g., a network layer 106, a link layer 108, or the like). For example, the application device 208 may determine a DSCP associated with the PDU 216, a PCP associated with the PDU 216, or a similar code point associated with the PDU 216. Additionally, or alternatively, the application device 208 may determine a priority level that maps to one of the code points described above in connection with FIGS. 1A-1C. For example, the application device 208 may be associated with various application layer priority levels and/or code points, each one of which may map to one or more DSCPs, one or more PCPs, or one or more other code points and/or priority classes. In such implementations, the application device 208 may determine an application layer priority level and/or code point associated with the PDU 216 such that the PDU 216 will be mapped to a preferred priority class at a lower layer device (e.g., at a device associated with the network layer 106 and/or the link layer 108).

Figure 2D:
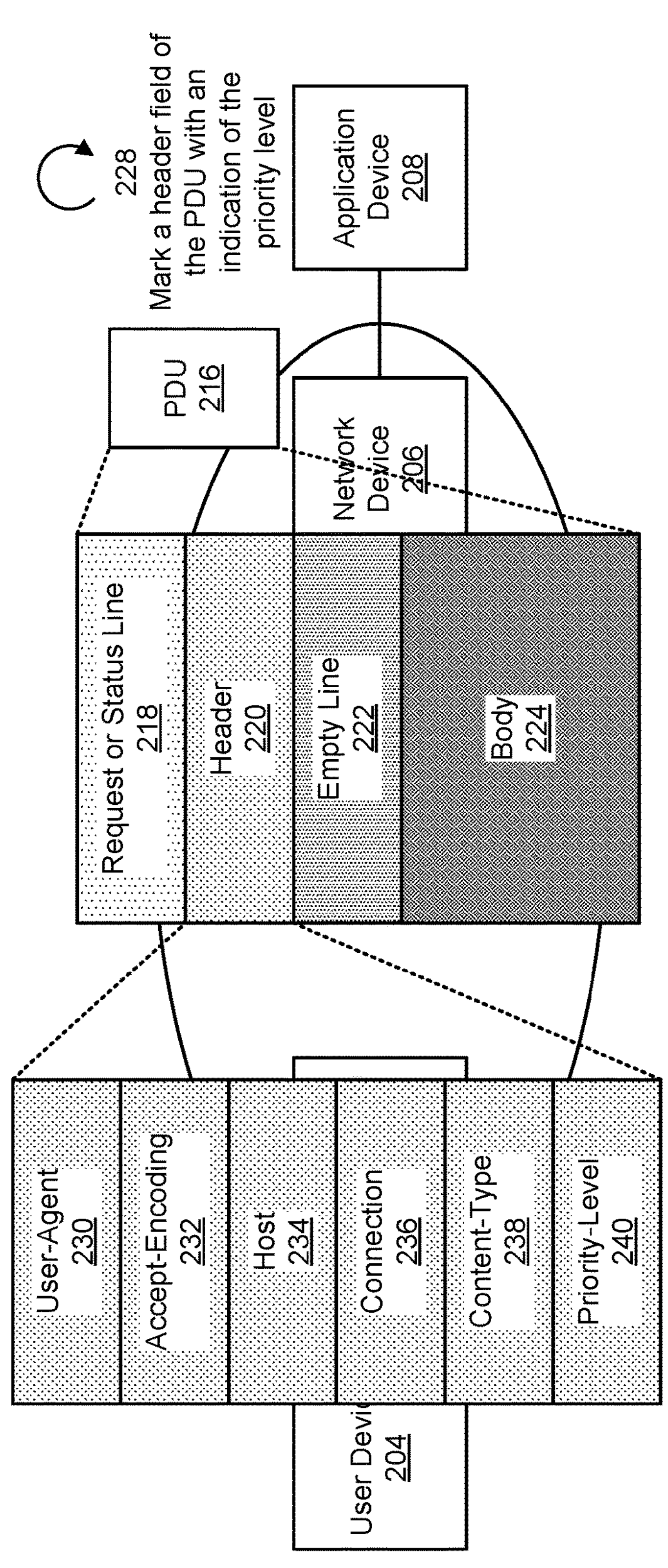

As shown by FIG. 2D, and as indicated by reference number 228, the application device 208 may mark a header field of the PDU 216 with an indication of the priority level associated with the PDU 216. More particularly, the header 220 may include one or more optional header fields, such as a user-agent field 230 (e.g., a field indicating an application, operating system, vendor, version, or similar information of a requesting user agent), an accept-encoding field 232 (e.g., a field indicating a content encoding, such as a compression algorithm), a host field 234 (e.g., a field indicating a host name and/or a port number, such as a port number of a server), a connection field 236 (e.g., a field indicating whether a network connection should remain open after a current transaction finishes), a content-type field 238 (e.g., a field indicating a multipurpose Internet mail extensions (MIME) type of a body load), and/or a priority-level field 240, among other fields.

In implementations including the priority-level field 240 or a similar field, the application device 208 may mark the priority-level field 240 of the header 220 of the PDU 216 with an indication of the priority level associated with the PDU 216, such as by indicating a DSCP associated with the PDU 216, a PCP associated with the PDU 216, and/or an application layer priority level and/or code point associated with the PDU 216 that may be mapped to a preferred priority class at a lower layer device. For example, in some implementations, such as in implementations in which the first network device 206 is associated with IP connectivity, the indication of the priority level associated with the PDU 216 (e.g., the indication included in the priority-level field 240 of the header 220) may indicate a DSCP associated with the PDU 216. Additionally, or alternatively, in implementations in which the first network device 206 is associated with Ethernet connectivity, the indication of the priority level associated with the PDU 216 (e.g., the indication included in the priority-level field 240 of the header 220) may indicate a PCP associated with the PDU 216.

Figure 2E:
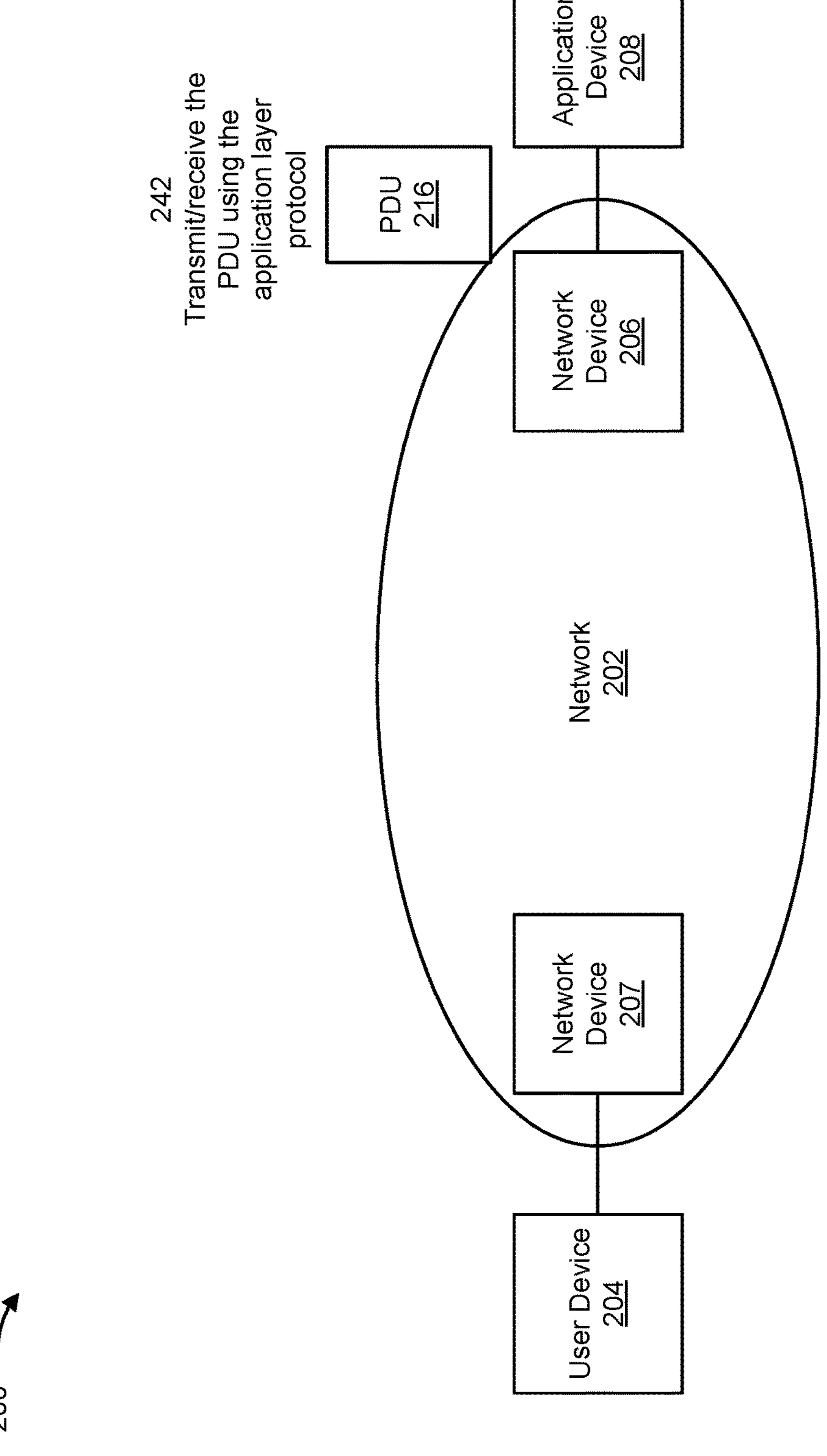

As shown by FIG. 2E, and as indicated by reference number 242, the application device 208 may transmit, and the first network device 206 may receive, the PDU 216. For example, the application device 208 may transmit the PDU 216 to the first network device 206 using an application layer protocol (e.g., one of HTTP or HTTPS including SSL or TLS). The transport layer protocol between a client and a server (e.g., between the application device 208 and the user device 204), such as TCP/IP, may divide the application PDU 216 into smaller pieces (e.g., segments) if the PDU 216 is larger than a transport protocol segment size. When the first network device 206 is associated with a network layer 106 (e.g., an IP protocol) and/or a link layer protocol (e.g., an Ethernet protocol) receives the PDU 216, the network layer protocol may add its own header information, such as a destination IP address, a source IP addresses, and/or a packet priority, before transmitting the packet. If a link layer is supported under a network layer, the link layer header information may be added before transmitting frames.

Figure 2F:
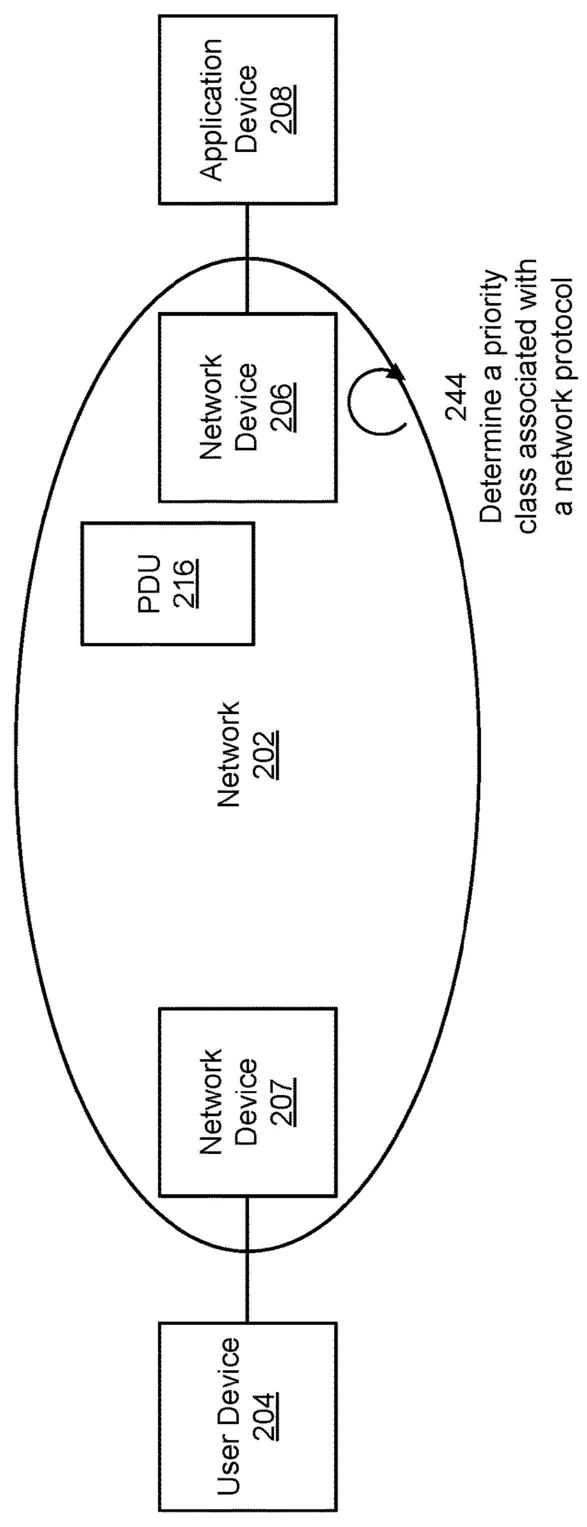

As shown by FIG. 2F, and as indicated by reference number 244, upon receiving the PDU 216 from the application device 208, the first network device 206 may determine a priority class associated with a network protocol (e.g., IP, an Ethernet protocol, or a similar protocol). For example, the first network device 206 may determine a priority class associated with a network protocol based on the indication of the priority level associated with the PDU 216 included in the priority-level field 240 of the header 220. In implementations in which a DSCP, a PCP, or a similar priority class and/or code point is expressly indicated by the priority-level field 240 of the header 220, determining a priority class associated with the network protocol may include reading the DSCP, the PCP, or the similar priority class and/or code point in the priority-level field 240 of the header 220. In implementations in which a DSCP, a PCP, or a similar priority class and/or code point is not expressly indicated by the priority-level field 240 of the header 220, the first network device 206 may determine a priority class associated with the network protocol by mapping the indication of the priority level included in the priority-level field 240 of the header 220 to a priority class associated with a network protocol (e.g., by mapping an application layer priority level to a priority class associated with a network protocol).

In some implementations, in the operations shown in connection with reference number 244, the first network device 206 may mark a packet associated with the PDU 216 (e.g., packet 247, described in more detail below in connection with FIG. 2G) with an indication of the priority class associated with the network protocol, such as for a purpose of indicating to other network components (e.g., the second network device 207, routers, or similar network devices) a QoS handling associated with the PDU 216. For example, the first network device 206 may append a header to the PDU 216 (e.g., an IP header, such as one of the IP headers described above in connection with the network layer 106 (e.g., an IPv4 packet 110 header or an IPv6 packet 112 header), a frame header, such as an Ethernet frame header or similar frame header described above in connection with the link layer 108, or a similar header) and/or may mark a header field with an indication of the priority class associated with the network protocol. In implementations in which the first network device 206 is associated with IP connectivity, the indication of the priority class associated with the network protocol may include an indication of a DSCP associated with the PDU 216. Moreover, in implementations in which the first network device 206 is associated with Ethernet connectivity, the indication of the priority class associated with the network protocol may include an indication of a PCP associated with the PDU 216.

Figure 2G:
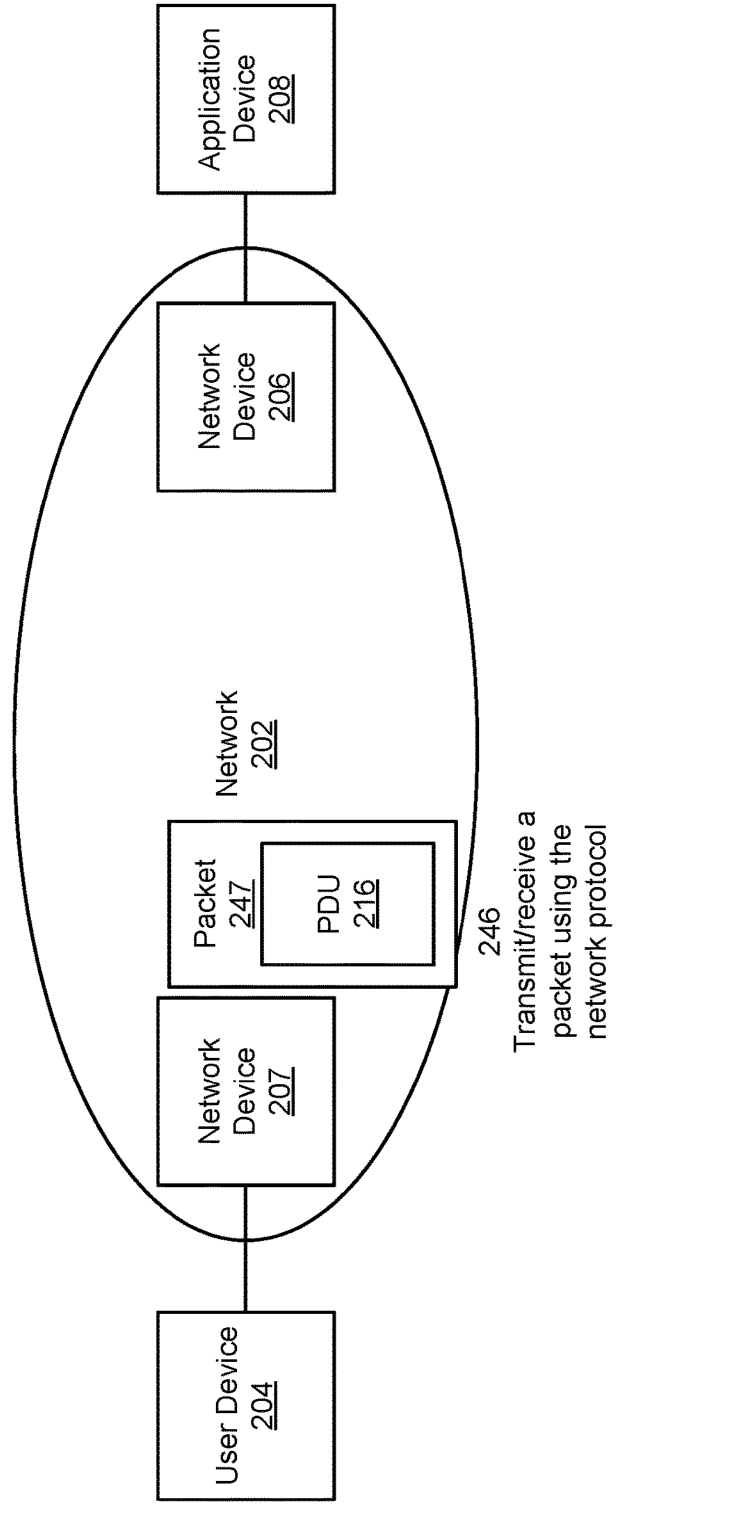

As shown by FIG. 2G, and as indicated by reference number 246, the first network device 206 may transmit, and the second network device 207 may receive, the PDU 216 based on the priority class associated with the network protocol. For example, the first network device 206 may transmit the PDU 216 in packets to the second network device 207 via the network 202 based on the priority class associated with the network protocol, such as by performing QoS handling in line with one of the DSCPs and/or PCPs described above in connection with FIGS. 1A-1C. For example, the first network device 206, the second network device 207, and/or other network devices and/or components may prioritize packets associated with a high priority over packets associated with a low priority when there is congestion at a network component (e.g., a router).

Moreover, as described above in connection with FIGS. 1A-1C, transmitting the PDU 216 via the network 202 may include encapsulating the PDU 216 in a packet and/or a frame. For example, as shown in FIG. 2G, the first network device 206 may encapsulate the PDU 216 in the packet 247 for transmission via the network 202, which may be an IP packet or a similar packet. In such implementations, a header of the packet 247 may be marked with a QoS indicator corresponding to the priority level included in the priority-level field 240 of the header 220 of the PDU 216. For example, a header of the packet 247 may be marked with a DSCP or similar code point corresponding to the priority level included in the priority-level field 240 of the header 220 of the PDU 216.

Figure 2H:
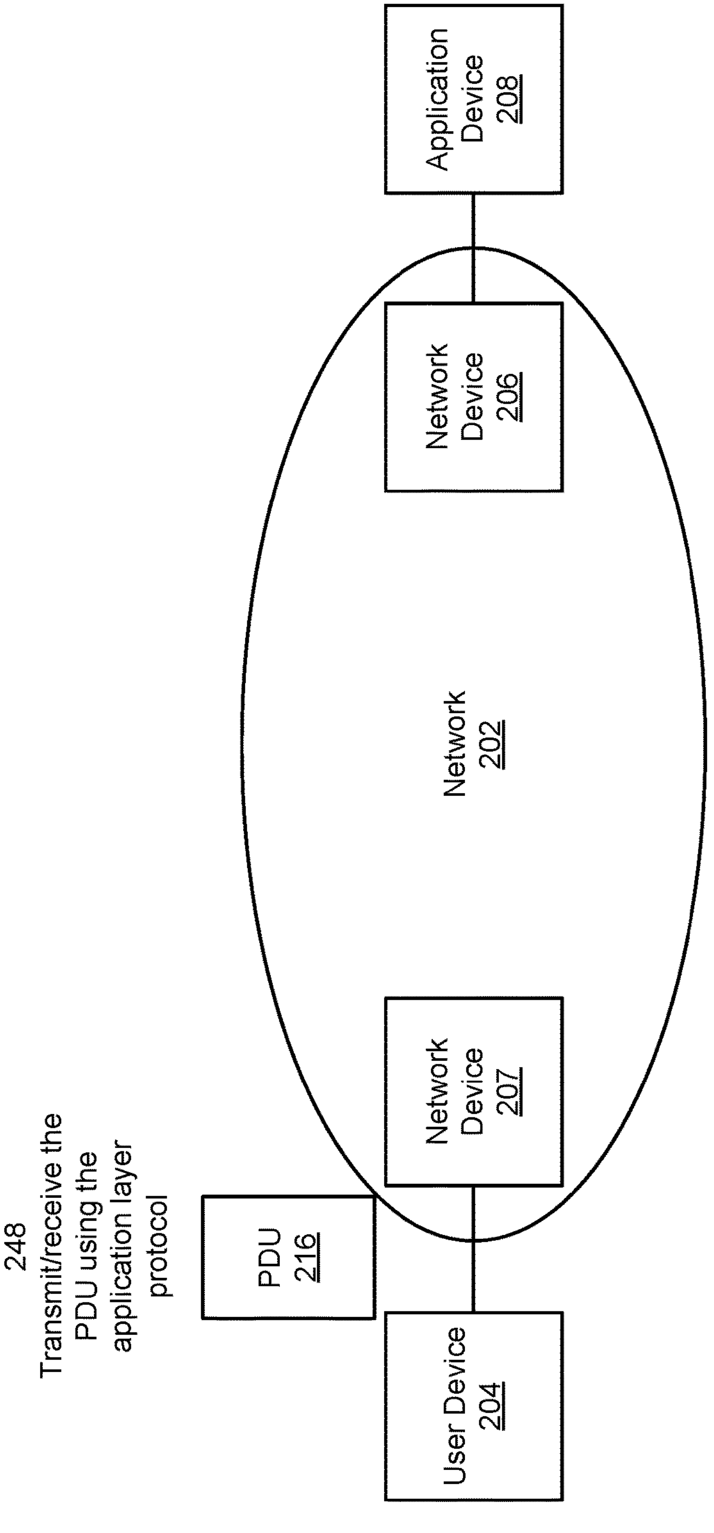

As shown by FIG. 2H, and as indicated by reference number 248, the second network device 207 may transmit, and the user device 204 may receive, the PDU 216, such as via the application layer protocol (e.g., one of HTTP or HTTPS). As described above in connection with FIGS. 1A-1C, transmitting the PDU 216 to the user device 204 via the application layer protocol may include stripping a packet header (e.g., an IP header) from a packet encapsulating the PDU 216 (e.g., packet 247), and transmitting the PDU 216 to the user device 204 (e.g., an application running at the user device 204) via the application layer protocol. As described above, the PDU 216 may be marked with an QoS indication (e.g., a priority level included in the priority-level field 240 of the header 220 of the PDU 216). In this way, the application running at the user device 204 may be indicated with a QoS information for the PDU 216 and/or may handle and/or respond to the PDU 216 in a manner consistent with the requested priority level.

In some implementations, such as implementations in which an application (e.g., the application device 208) uses HTTP, HTTPS, TCP, or similar protocols, traffic associated with the application may be expressed in terms of requests per second (RPS) and/or connections per second (CPS). However, certain network devices (e.g., the first network device 206, the second network device 207, or other devices associated with the network 202) may need to know other parameters associated with the application, such as packets per second (PPS) and/or bytes per second (Bps) and/or bits per second (bps), in order to size the network 202 correctly to support application traffic. In some implementations, the first network device 206 may thus convert an RPS and/or CPS metric associated with an application to a PPS and/or Bps/bps metric, such as for a purpose of sizing a network and/or allocating network resources to an application. Put another way, the first network device 206 (or another network device) may map application traffic to IP traffic based on converting certain metrics associated with an application (e.g., RPS and/or CPS) to metrics associated with a network layer (e.g., PPS and/or Bps/bps). The mapping of application traffic to network layer traffic and/or link layer traffic may be done alternatively by a management system, such as an orchestrator (e.g., shown as management system/orchestrator 251 in FIGS. 2I-2K), which may allocate network capacity accordingly prior to traffic flow between the application device 208 and the user device 204.

Figure 2I:
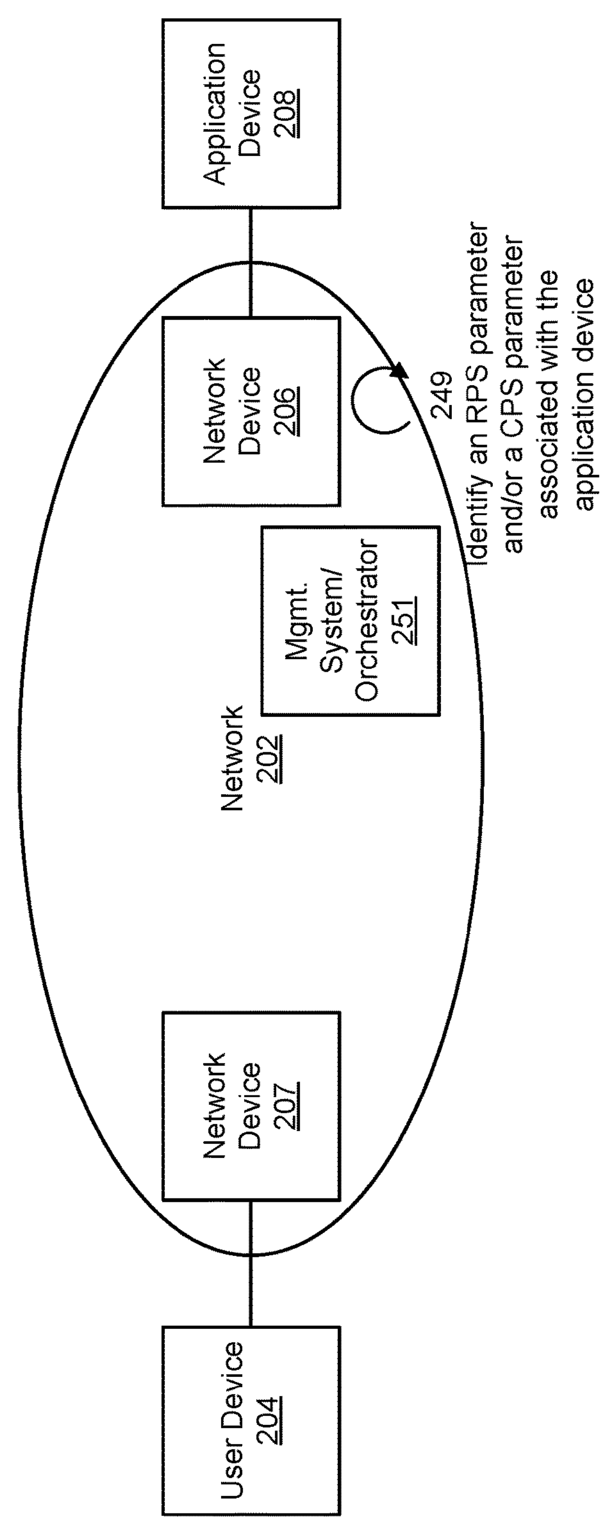

For example, returning to example 200, as shown by FIG. 2I, and as indicated by reference number 249, the first network device 206, the management system/orchestrator 251, or a similar network device may identify at least one of an RPS metric associated with the application device 208 (e.g., associated with an application program at the application device 208) or a CPS metric associated with the application device 208. In some implementations, the first network device 206, the management system/orchestrator 251, or a similar network device may identify the at least one of the RPS metric or the CPS metric by monitoring application layer traffic associated with the application device 208. In some other implementations, the first network device 206, the management system/orchestrator 251, or a similar network device may identify the at least one of the RPS metric or the CPS metric by receiving an indication of the at least one of the RPS metric or the CPS metric from another device, such as from the application device 208 and/or from another network-connected device configured to monitor application layer traffic associated with the application device 208.

Figure 2J:
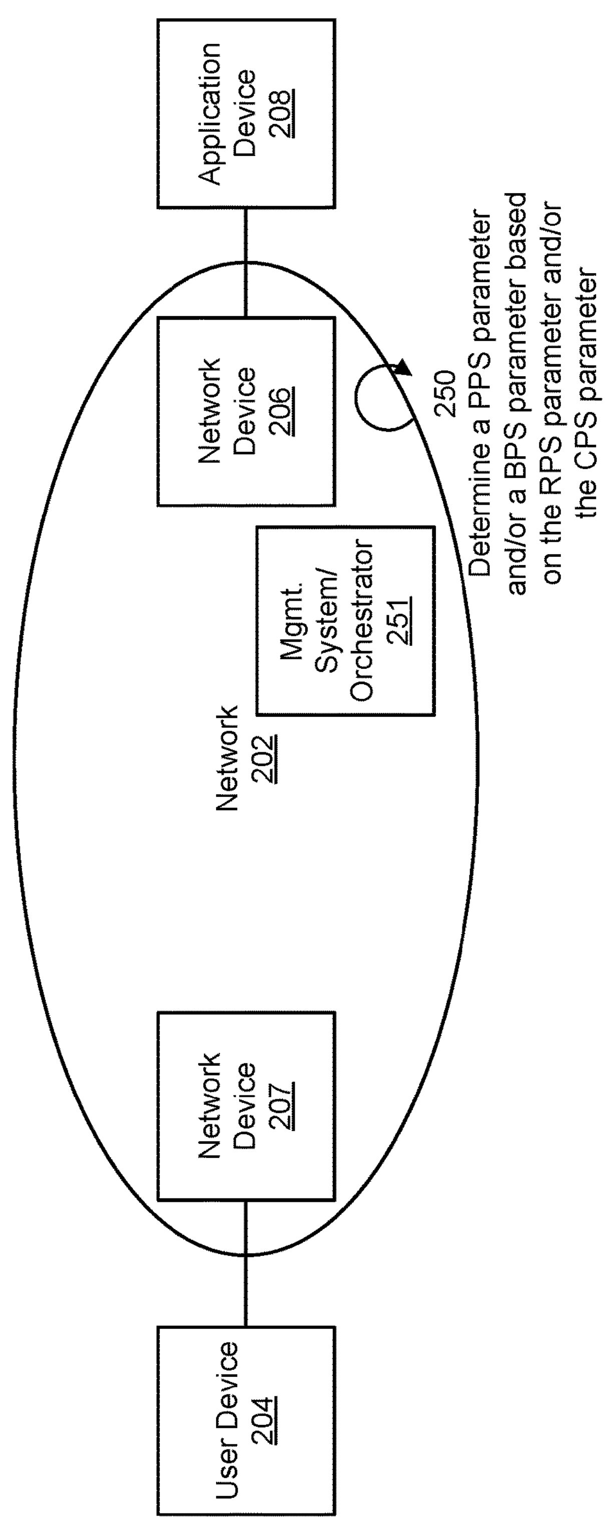

As shown by FIG. 2J, and as indicated by reference number 250, the first network device 206, the management system/orchestrator 251, or a similar network device may determine at least one of a PPS metric associated with the application device 208 or a Bps/bps metric associated with the application device 208 based on the at least one of the RPS parameter or the CPS parameter. In some implementations, the first network device 206, the management system/orchestrator 251, or a similar network device may determine the PPS metric and/or the Bps/bps metric based on a TCP window size, such as a size of a TCP congestion window (CWND). In some other implementations, the first network device 206, the management system/orchestrator 251, or a similar network device may determine the PPS metric and/or the Bps/bps metric based on a size of application layer PDUs being transmitted by the application (e.g., PDU 216).

More particularly, for IP traffic, the first network device 206, the management system/orchestrator 251, or a similar network device may determine a PPS metric based on an RPS and/or CPS associated with the application device 208. For example, for IP traffic, a PPS metric may be determined based on the equation $PPS=RPS \times TCP$ window size, and/or based on the equation $PPS=CPS \times TCP$ window size. Furthermore, a Bps metric may be determined based on the equation Bps=RPS×TCP window size×PDU size (in bytes), and/or based on the equation Bps=CPS×TCP window size×PDU size (in bytes) for IP traffic. Similarly, a bps metric may be determined based on the equation bps=RPS×TCP window size×PDU size (in bytes)×8, and/or based on the equation bps=CPS×TCP window size×PDU size (in bytes)×8 for IP traffic. In these equations, a TCP Window size (e.g., CWND) may be a maximum value, a minimum value, or an average value which will produce maximum, minimum, or average Bps/bps values, respectively. In some implementations, packet and/or byte counts may be calculated for some other time interval, such as minute or day from the same equations where HTTP/HTTPS requests or calls along with average, maximum, and/or minimum CWND values are given for the same time interval. In some implementations, a maximum default PDU size associated with an HTTP and/or HTTPS message may be 2 megabytes (MB) (e.g., the PDU size in the above equations may be 2,000,000 bytes), and/or a maximum window size for TCP (e.g., a CWND size) may be 65,536 bytes (e.g., the TCP window size in the above equations may be 65,536 bytes).

For Ethernet traffic, the first network device 206 may determine a PPS metric and/or a Bps/bps metric based on an RPS and/or CPS associated with the application device 208. For example, for Ethernet traffic, a PPS metric may be determined based on the equation PPS=RPS×TCP window size and/or based on the equation PPS=CPS×TCP window size. A Bps metric may be determined based on the equation Bps=RPS×TCP window size×PDU size (in bytes) and/or Bps=CPS×TCP window size×PDU size (in bytes). And a bps metric may be determined based on the equation bps=RPS×TCP window size×PDU size (in bytes)×8 and/or bps=CPS×TCP window size×PDU size (in bytes)×8. Moreover, in some implementations, a size of an Ethernet frame (in bytes) may be equal to a PDU size plus Ethernet overhead. The Ethernet overhead may include a preamble plus a start frame delimiter (SFD), which may be 8 bytes; a destination address, which may be 8 bytes; a source address, which may be 8 bytes; a type indicator, which may be 2 bytes; a frame check sequence (FCS) field (e.g., used for a cyclic redundancy check (CRC)), which may be 4 bytes; and/or an interframe gap, which may be 12 bytes. In such implementations, the Ethernet overhead may include 42 bytes. Accordingly, for Ethernet traffic, a Bps metric may be determined based on the equation Bps=CPS×TCP window size×(PDU size+42 bytes), and/or a bps metric may be determined based on the equation bps=CPS×TCP window size×(PDU size+42 bytes)×8.

Figure 2K:
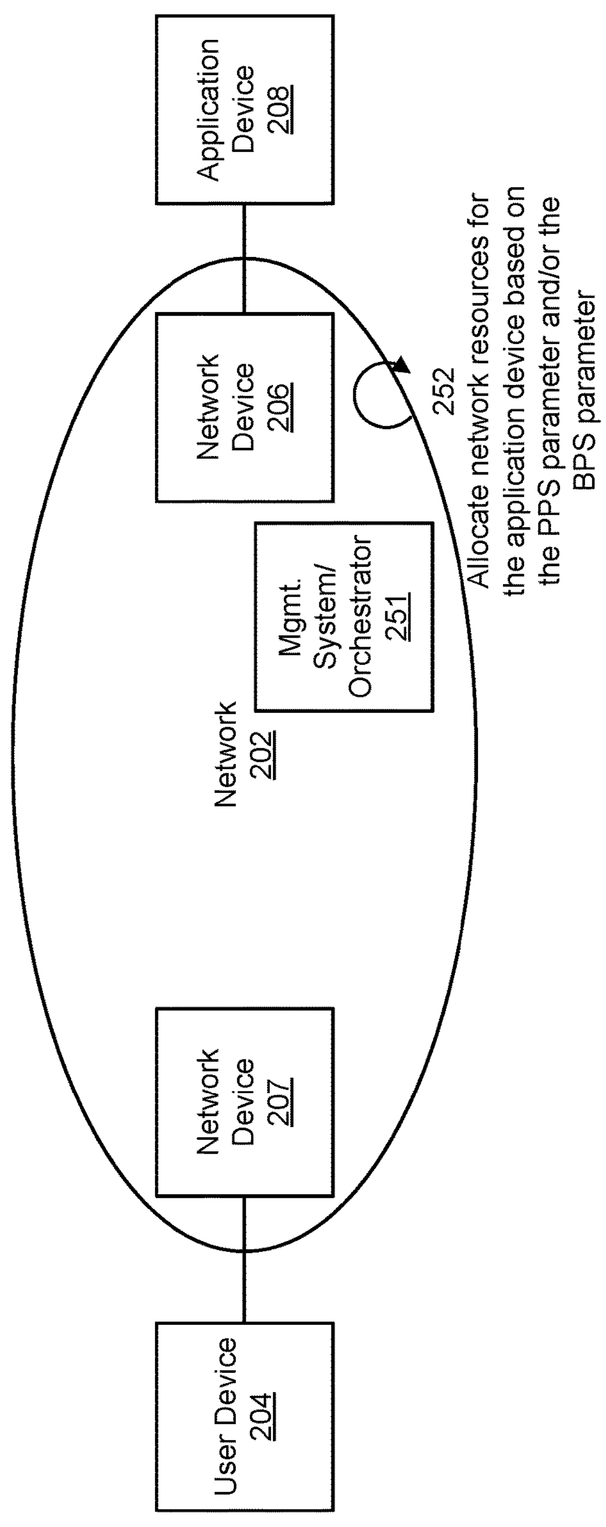

As shown by FIG. 2K, and as indicated by reference number 252, the first network device 206, the management system/orchestrator 251, or a similar network device may allocate network resources for use by the application device 208 based on the at least one of the PPS parameter and/or the Bps/bps parameter. In some implementations, allocating network resources for use by the application device 208 based on the at least one of the PPS parameter and/or the Bps/bps parameter may include calculating a link utilization associated with the application device 208 based on the PPS parameter and/or the Bps parameter. For example, the first network device 206, the management system/orchestrator 251, or a similar network device may calculate a link utilization associated with the application device 208 based on dividing a Bps or bps parameter associated with the application device 208 by a physical link rate (e.g., a link rate associated with one of IP connectivity or Ethernet connectivity, in bytes or bits per second).

Based on an application device 208 indicating a priority level of a PDU and/or by indicating a network layer priority class that is to be associated with the PDU as described above in connection with the various implementations, application layer traffic may be handled based on optimal priority considerations, resulting in reduced communication errors and thus reduced power, computing, and network resource consumption that would otherwise be required to correct communication errors, decreased packet drop rates, and more efficient usage of network resources. Moreover, based on a network device mapping an RPS metric and/or CPS metric associated with an application to a PPS metric and/or an Bps/bps metric, the network device may properly allocate resources to an application and/or size a network for the application, resulting in more efficient usage of network resources, reduced communication errors, and thus reduced power, computing, and network resource consumption that would otherwise be required to correct communication errors.

As indicated above, FIGS. 2A-2K are provided as an example. Other examples may differ from what is described with regard to FIGS. 2A-2K. The number and arrangement of devices shown in FIGS. 2A-2K are provided as an example. In practice, there may be additional devices, fewer devices, different devices, or differently arranged devices than those shown in FIGS. 2A-2K. Furthermore, two or more devices shown in FIGS. 2A-2K may be implemented within a single device, or a single device shown in FIGS. 2A-2K may be implemented as multiple, distributed devices. Additionally, or alternatively, a set of devices (e.g., one or more devices) shown in FIGS. 2A-2K may perform one or more functions described as being performed by another set of devices shown in FIGS. 2A-2K.

Figure 3:
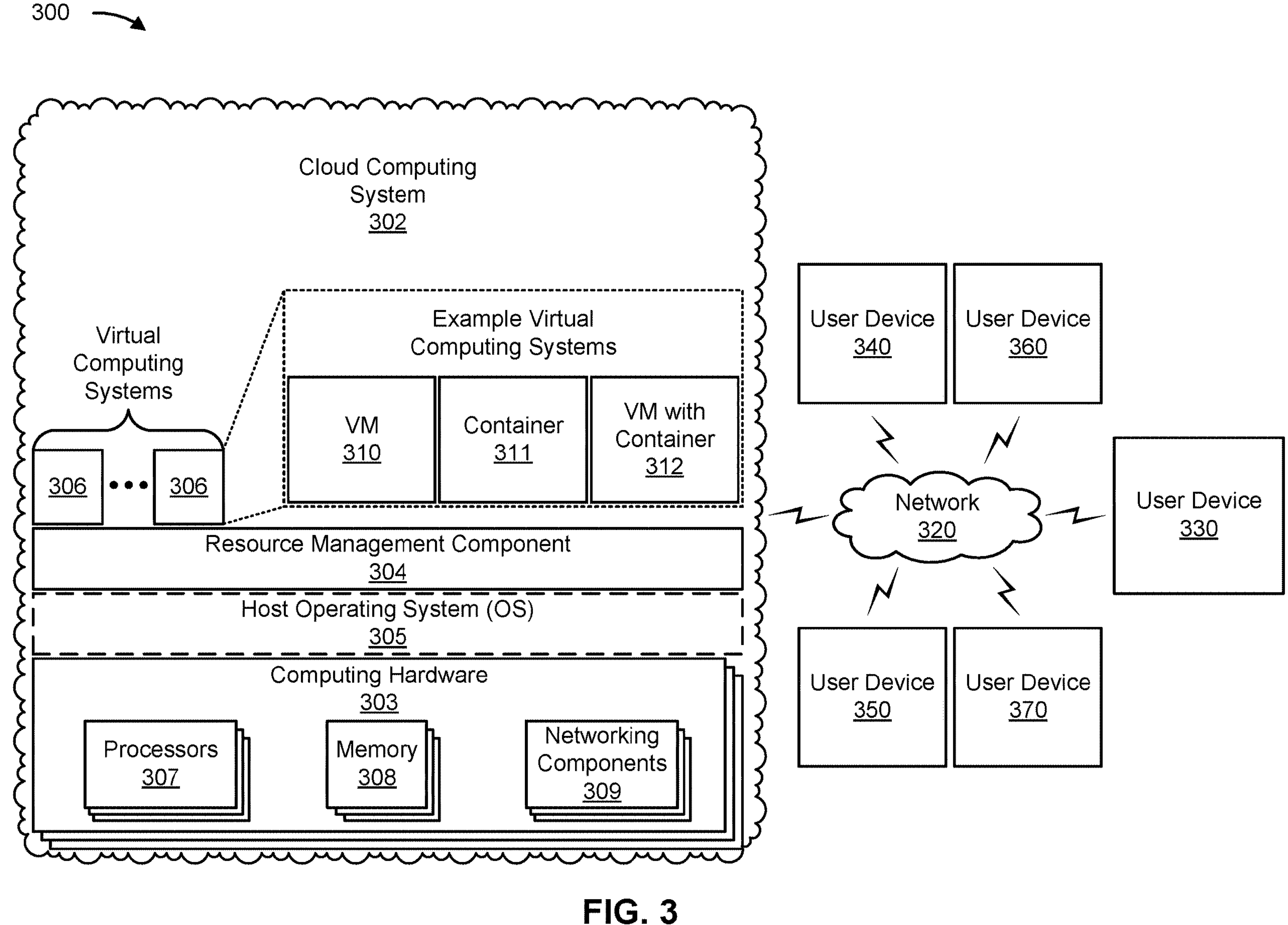
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a cloud computing system 302. The cloud computing system 302 may include one or more elements 303-312, as described in more detail below. As further shown in FIG. 3, environment 300 may include a network 320, and one or more user devices (e.g., user device 204) connected to the cloud computing system 302 via the network 320 (shown in FIG. 3 as user device 330, user device 340, user device 350, user device 360, and user device 370). In some implementations, the cloud computing system 302 may be associated with a cloud service provider, and the user devices 330-370 may be associated with a cloud service user. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices. In some implementations, the first network device 206, the second network device 207, the application device 208, and/or the management system/orchestrator 251 described above in connection with FIGS. 2A-2K may be associated with and/or correspond to one of the virtual computing systems 306.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

In some implementations, the application device 208, the first network device 206, the second network device 207, the management system/orchestrator 251, and/or another device described herein may not be cloud-based (e.g., may be implemented outside of a cloud computing system) or may be partially cloud-based. For example, the application device 208, the first network device 206, the second network device 207, the management system/orchestrator 251, and/or another device described herein may include one or more devices that are not part of the cloud computing system 302, such as device 400 of FIG. 4, which may include a standalone server or another type of computing device. The application device 208, the first network device 206, the second network device 207, the management system/orchestrator 251, and/or another device described herein may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user devices 330-370 may be any type of network-connected devices configured to receive data (e.g., PDUs) from the cloud computing system 302. In some implementations, the user devices 330-370 may be associated with a user of an application, such as an application associated with the application device 208 and/or one the virtual computing systems. In some implementations, one or more of the user devices 330-370 may correspond to a cloud service user of a service provided by the cloud computing system 302. In such implementations, one or more of the user devices 330-370 may be in communication with the cloud computing system 302 (e.g., a cloud service provider) via a cloud user-to-network interface (UNI). More particularly, in some implementations, a cloud service user (which may be associated with one of the user devices 330-370), may connect to a cloud service provider (e.g., the cloud computing system 302), and ultimately to a cloud application, via a cloud UNI.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
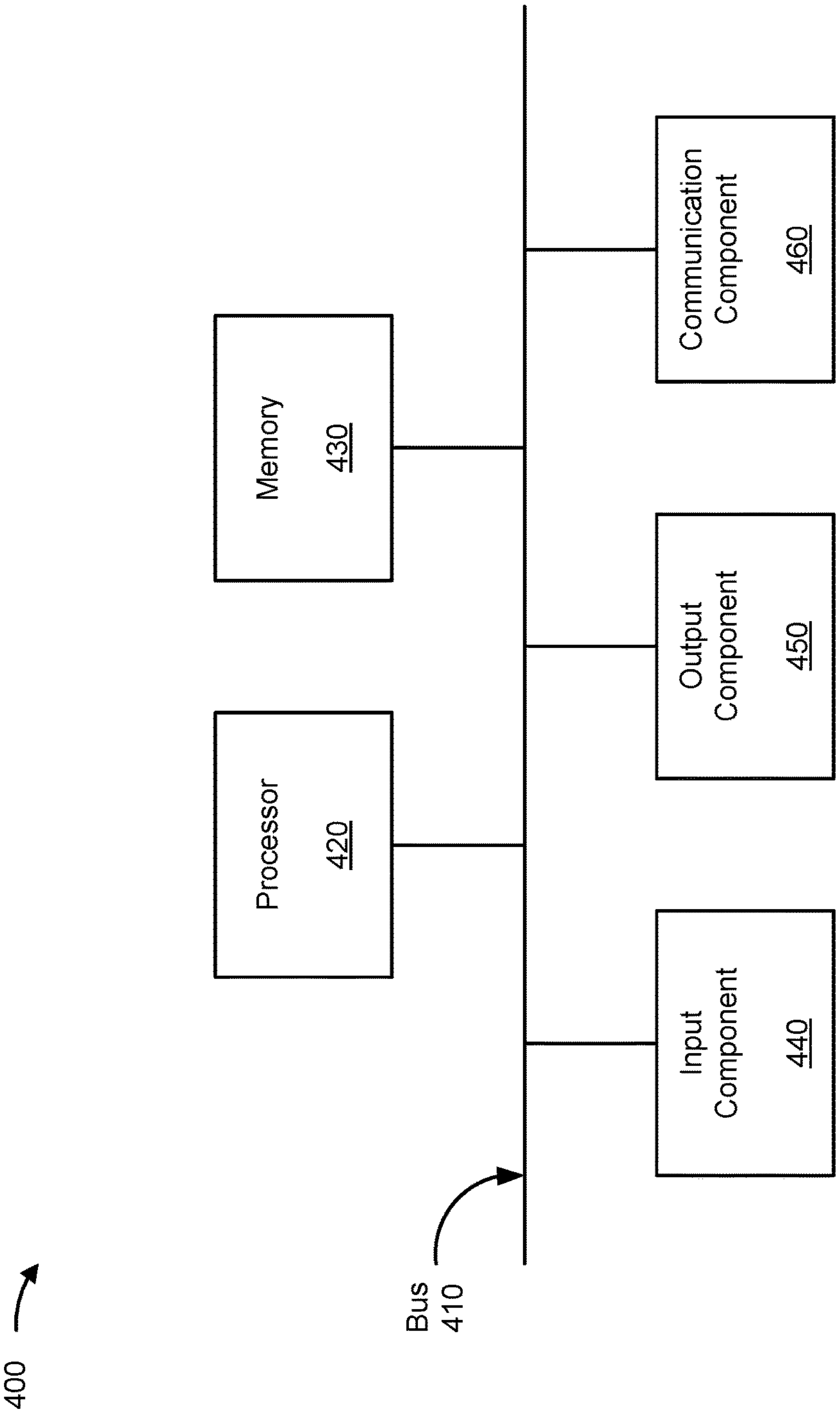
FIG. 4 is a diagram of example components of a device associated with application layer protocol QoS marking.

FIG. 4 is a diagram of example components of a device 400 associated with application layer protocol QoS marking. The device 400 may correspond to the user device 204, the first network device 206, the second network device 207, the application device 208, the management system/orchestrator 251, the user devices 330-370, and/or any device described as alternatively being associated with a virtual computing system 306 in connection with FIG. 3. In some implementations, the user device 204, the first network device 206, the second network device 207, the application device 208, the management system/orchestrator 251, the user devices 330-370, and/or any device described as alternatively being associated with a virtual computing system 306 in connection with FIG. 3 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
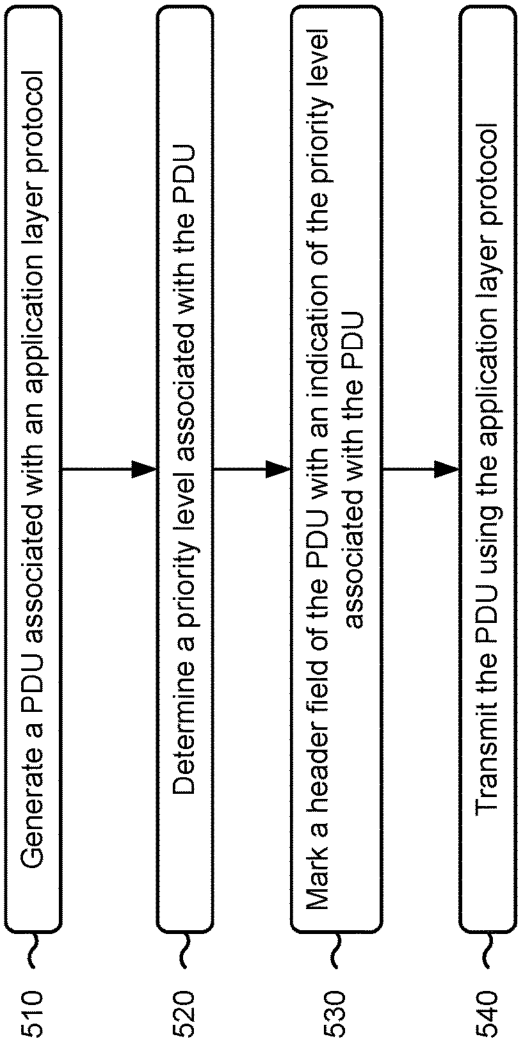
FIG. 5 is a flowchart of an example process associated with application layer protocol QoS marking.

FIG. 5 is a flowchart of an example process 500 associated with application layer protocol QoS marking. In some implementations, one or more process blocks of FIG. 5 may be performed by an application device (e.g., application device 208). In some implementations, one or more process blocks of FIG. 5 may be performed by another device or a group of devices separate from or including the first network device, such as a network device (e.g., first network device 206, second network device 207), a management system and/or orchestrator device (e.g., management system/orchestrator 251), a user device (e.g., user device 204, 330-370), and/or a virtual computing device (e.g., any device described as being associated with a virtual computing system 306 in connection with FIG. 3). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include generating a PDU associated with an application layer protocol, wherein the PDU includes a header field (block 510). For example, the application device may generate a PDU associated with an application layer protocol, wherein the PDU includes a header field, as described above. In some implementations, the application layer protocol is one of HTTP or HTTPS, and the header field is one of an HTTP header field or an HTTPS header field.

As further shown in FIG. 5, process 500 may include determining a priority level associated with the PDU (block 520). For example, the application device may determine a priority level associated with the PDU, as described above.

As further shown in FIG. 5, process 500 may include marking the header field with an indication of the priority level associated with the PDU (block 530). For example, the application device may mark the header field with an indication of the priority level associated with the PDU, as described above.

As further shown in FIG. 5, process 500 may include transmitting, to a network device, the PDU using the application layer protocol (block 540). For example, the application device may transmit the PDU using the application layer protocol, as described above. In some implementations, the network device may be associated with IP connectivity, and the indication of the priority level associated with the PDU may indicate a DSCP. In some other implementations, the network device may be associated with Ethernet connectivity, and the indication of the priority level associated with the PDU may indicate a PCP.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by an application layer associated with an application device, a protocol data unit (PDU) associated with one of hypertext transfer protocol (HTTP) or HTTP secure (HTTPS), wherein the PDU includes a HTTP header field or a HTTPS header field;

determining, by the application layer, a differentiated services code point (DSCP) or a priority code point (PCP) that is to be applied to the PDU at a network layer associated with a network device;

marking, by the application layer, the HTTP header field or the HTTPS header field with an indication of the determined DSCP or PCP; and transmitting, by the application layer to the network layer, the PDU using the HTTP or HTTPS.

2. The method of claim 1, wherein the network device is associated with Internet protocol connectivity, and wherein the application layer determines the DSCP and marks the HTTP header field or the HTTPS header field with an indication of the determined DSCP.

3. The method of claim 1, wherein the network device is associated with Ethernet connectivity, and wherein the application layer determines the PCP and marks the HTTP header field or the HTTPS header field with an indication of the determined PCP.

4. The method of claim 1, wherein the network device marks a packet associated with the PDU with the DSCP or PCP determined by the application layer.

5. A method, comprising:

receiving, by a first network device from an application device using one of hypertext transfer protocol (HTTP) or HTTP secure (HTTPS), a protocol data unit (PDU) including a HTTP header field or a HTTPS header field, wherein the HTTP header field or the HTTPS header field includes an indication of a code point value associated with a network protocol that is to be associated with the PDU, wherein the code point value indicates a network layer priority class;

identifying, by the first network device, the code point value indicated in the HTTP header field or the HTTPS header field;

marking, by the first network device, a packet associated with the PDU with an indication of the code point value; and transmitting, by the first network device to a second network device, the packet based on the code point value.

6. The method of claim 5, wherein the first network device is associated with Internet protocol connectivity, and wherein the indication of the code point value indicates a differentiated services code point.

7. The method of claim 5, wherein the first network device is associated with Ethernet connectivity, and wherein the indication of the code point value indicates a priority code point.

8. The method of claim 5, further comprising:

identifying, by the first network device, at least one of a requests per second (RPS) metric associated with the application device or a connections per second (CPS) metric associated with the application device; and determining, by the first network device, at least one of a packets per second (PPS) metric associated with the application device, a bytes per second (Bps) metric associated with the application device, or a bits per second (bps) metric associated with the application device based on the at least one of the RPS metric or the CPS metric.

9. The method of claim 8, wherein determining the at least one of the PPS metric, the Bps, or the bps metric further includes determining the at least one of the PPS metric, the Bps metric, or the bps metric based on a transmission control protocol window size.

10. The method of claim 8, wherein determining the at least one of the PPS metric, the Bps metric, or the bps metric further includes determining the at least one of the PPS metric, the Bps metric, or the bps metric based on a size of the PDU.

11. The method of claim 8, further comprising allocating network resources for use by the application device based on the at least one of the PPS metric, the Bps metric, or the bps metric.

12. The method of claim 5, wherein the code point value is a differentiated services code point (DSCP) or a priority code point (PCP) associated with the PDU.

13. A network device, comprising:

one or more processors configured to:

receive, from an application using hypertext transfer protocol (HTTP) or HTTP secure (HTTPS), a PDU including a HTTP header field or a HTTPS header field, wherein the HTTP header field or the HTTPS header field includes an indication of a code point value associated with a network protocol that is to be associated with the PDU, wherein the code point value indicates a network layer priority class;

identify the code point value indicated in the HTTP header field or the HTTPS header field;

mark a packet associated with the PDU with an indication of the code point value; and transmit, to another network device using the network protocol, the PDU based on the code point value.

14. The network device of claim 13, wherein the network device is associated with Internet protocol connectivity, and wherein the indication of the code point value indicates a differentiated services code point.

15. The network device of claim 13, wherein the network device is associated with Ethernet connectivity, and wherein the indication of the code point value indicates a priority code point.

16. The network device of claim 13, wherein the one or more processors are further configured to:

identify at least one of a requests per second (RPS) metric associated with the application or a connections per second (CPS) metric associated with the application; and determine at least one of a packets per second (PPS) metric associated with the application, a bytes per second (Bps) metric associated with the application, or a bits per second (bps) metric associated with the application based on the at least one of the RPS metric or the CPS metric.

17. The network device of claim 16, wherein the one or more processors, to determine the at least one of the PPS metric, the Bps metric, or the bps metric, are further configured to determine the at least one of the PPS metric, the Bps metric, or the bps metric based on a transmission control protocol window size.

18. The network device of claim 16, wherein the one or more processors, to determine the at least one of the PPS metric, the Bps metric, or the bps metric, are further configured to determine the at least one of the PPS metric, the Bps metric, or the bps metric based on a size of the PDU.

19. The network device of claim 16, wherein the one or more processors are further configured to allocate network resources for use by the application based on the at least one of the PPS metric, the Bps metric, or the bps metric.

20. The network device of claim 13, wherein the code point value is a differentiated services code point (DSCP) or a priority code point (PCP) associated with the PDU.

* * * * *